(12) United States Patent
Ingram

(10) Patent No.: US 11,119,667 B2
(45) Date of Patent: Sep. 14, 2021

(54) MASTER ADAPTIVE READ ISSUING CAPABILITY BASED ON THE TRAFFIC BEING GENERATED

(71) Applicant: Arm Limited, Cambridge (GB)

(72) Inventor: Graeme Leslie Ingram, Royston (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/176,696

(22) Filed: Oct. 31, 2018

(65) Prior Publication Data

US 2020/0133529 A1    Apr. 30, 2020

(51) Int. Cl.
*G06F 3/06* (2006.01)

(52) U.S. Cl.
CPC .......... *G06F 3/0631* (2013.01); *G06F 3/0604* (2013.01); *G06F 3/0656* (2013.01); *G06F 3/0659* (2013.01); *G06F 3/0673* (2013.01)

(58) Field of Classification Search
CPC .............................. G06F 3/0656; G06F 3/0659
See application file for complete search history.

(56) References Cited

U.S. PATENT DOCUMENTS

| | | | | |
|---|---|---|---|---|
| 5,481,701 A | * | 1/1996 | Chambers, IV | G06F 12/0802 711/111 |
| 8,612,374 B1 | * | 12/2013 | Amdahl | H04L 41/147 706/21 |
| 2002/0196887 A1 | * | 12/2002 | Heikkila | H03K 5/00006 375/371 |
| 2005/0198459 A1 | * | 9/2005 | Bogin | G06F 5/06 711/167 |
| 2012/0124294 A1 | * | 5/2012 | Atkisson | G06F 11/108 711/135 |

* cited by examiner

*Primary Examiner* — David Yi
*Assistant Examiner* — Nicholas A. Paperno
(74) *Attorney, Agent, or Firm* — EIP US LLP

(57) ABSTRACT

A method, processor and system for requesting data from storage. The method comprising the steps of identifying one or more characteristics of data to be fetched from storage, wherein the characteristics are predetermined; identifying a buffer size characteristic of a processor. The method also comprises the step of issuing memory requests by the processor for the data based on the identified one or more characteristics of the data and the buffer size characteristic.

19 Claims, 3 Drawing Sheets

MASTER ADAPTIVE READ ISSUING CAPABILITY BASED ON THE TRAFFIC BEING GENERATED

BACKGROUND OF THE INVENTION

Field of the Invention

The present invention relates to a method, processor and system for adapting the read issuing capability of a master, such as a processor, based on the traffic being generated.

Background

Adapting the read issuing capability of a master, such as managing data handling and memory requests are important for ensuring the most efficient use of computing resources in a system, when requesting data items from a slave, such as storage. Some data handling processes may be processed at a deterministic processing rate, meaning that data may be processed as fast as it is received from memory, however other data handling processes may return data which requires pre-processing before being able to be processed. As a result, such data is unable to be processed as fast as it is received from storage, and is therefore processed at a non-deterministic rate. In such cases, delays associated with the additional pre-processing can result in an inefficient use of computing resources.

SUMMARY

According to a first aspect of the present disclosure, there is provided a method of requesting data, the method comprising the steps of identifying one or more characteristics of data to be fetched from storage, wherein the characteristics are predetermined; identifying a buffer size characteristic of a processor; and issuing memory requests by the processor for the data based on the identified one or more characteristics of the data and the buffer size characteristic.

According to a second aspect of the present disclosure, there is provided a processor for fetching data from storage, the processor comprising a characteristic identification module for identifying one or more characteristics of data to be fetched from storage, wherein the characteristics are predetermined; a buffer for storing the data fetched from the storage, prior to being processed by the processor; and a memory request issuance module for issuing memory requests to fetch the data from storage, based on the identified one or more characteristics of the data and a size characteristic of the buffer.

According to a third aspect of the present disclosure, there is provided a system for requesting data, the system comprising storage; one or more memory controllers arranged to access the storage; a processor for requesting data from storage, the processor arranged to issue memory requests to the one or more memory controllers based on characteristics of the data.

According to a fourth aspect of the present disclosure, there is provided a non-transitory computer readable storage medium comprising a set of computer readable instruction stored thereon which, when executed by at least one processor, cause the at least one processor identify one or more characteristics of data to be fetched from storage, wherein the characteristics are predetermined; identify a buffer size characteristic of a processor; and issue memory requests by the processor for the data based on the identified one or more characteristics of the data and the buffer size characteristic.

BRIEF DESCRIPTION OF THE DRAWINGS

Further features and advantages of the invention will become apparent from the following description, given by way of example only, which is made with reference to the accompanying drawings in which like reference numerals are used to denote like features.

DETAILED DESCRIPTION OF CERTAIN INVENTIVE EMBODIMENTS

Figure 1:
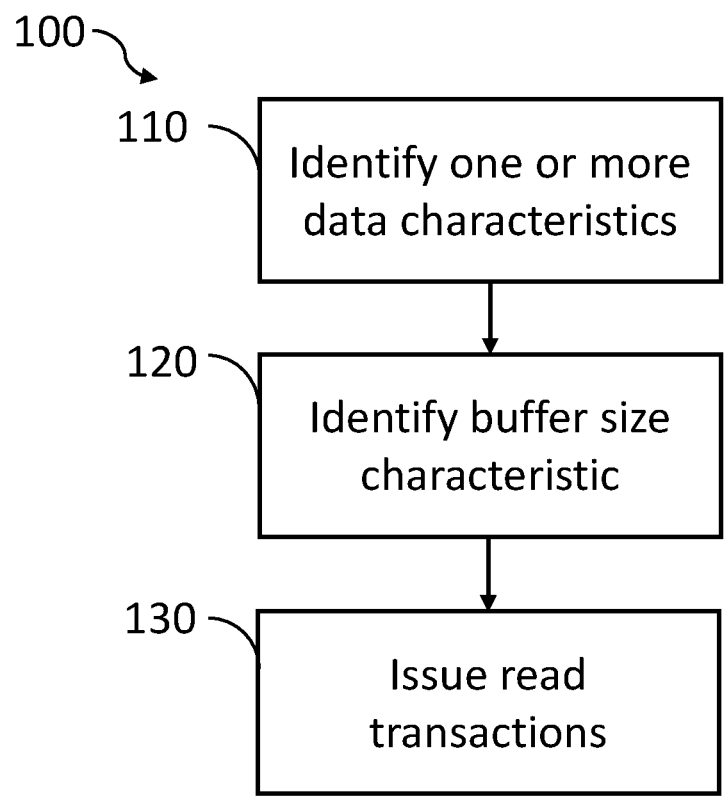
FIG. 1 is a flow diagram showing a method of requesting data according to examples.

Details of methods, systems and processors according to examples will become apparent from the following description with reference to the Figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain features omitted and/or necessarily simplified for the ease of explanation and understanding of the concepts underlying the examples.

In some examples, a master, such as a processor, request data from a slave, such as storage, and may issue memory transactions at first data request rate when the data is stored in a compressed format, and issue memory requests at a second, higher data request rate when the data is stored in an uncompressed format. The data request rate may be dependent on the characteristics of the data being requested, and a size characteristic of the buffer of the master, requesting the data. Such data characteristics include but is not limited to whether the data is compressed and whether the data may be processed at a deterministic or non-deterministic processing rate.

The master may undertake data handling operations at a deterministic processing rate that is, the data can be processed as it is received from storage. This is the case for uncompressed data, however, it will be appreciated that uncompressed data in some embodiments may require additional processing. In other examples, the master may undertake data handling operations at a non-deterministic processing rate, that is data may be received from storage, added to a buffer, pre-processed in some way, and then processed. This may be the case, for example, when the data is compressed and requires further processing such as decompression prior to being processed.

When requesting compressed data, consideration needs to be given as to the size of the data once decompressed as well as the size of the master's buffer such that it can be ensured that the requested data, may be processed as and when required, and that the data request rate for issuing memory requests prevents buffer overrun occurring.

By considering the characteristics of the data when issuing memory requests, the master may be able to increase the data issuing capability, thereby potentially increasing the bandwidth of the master.

That is, for example, by knowing when requesting the data whether the data is compressed or uncompressed, or whether the data may be processed at a deterministic or non-deterministic processing rate, memory requests may be issued at an associated rate. For example, where uncompressed data is requested, as this data is processed as it is received, more memory requests may be issued. The received data will be processed, as it is fetched from storage and therefore the data request rate may be such that the data requested by the memory requests may exceed the size of the buffer given that some data items will have been processed and removed from the buffer prior to all data items being received.

In certain embodiments, such as machine learning processors, data sets are often stored in a compressed format in order to reduce the amount of space required to hold them in storage. The processing time required to decompress and distribute such data is non-deterministic, as the amount of decompressed data is dependent upon its value. This means that a buffer of the master needs to be large enough to store the data for all the memory requests that are issued whilst decompression is taking place. When reading other data formats, such as uncompressed data or data which requires processing, but which may be processed in a deterministic way, data may be translated and distributed in a more deterministic way which means that the number of memory requests may exceed the buffer size of the master. This results in two benefits, namely a reduction in the size of the buffer required, and an increase in the bandwidth of the master, as the data processed by the master can be equivalent whether compressed with a reduced issuing capability or uncompressed with an increased data request rate. At a compile time of the routine used to issue the memory requests, such as a machine learning routine, the characteristics of the data may be stored, for example in a header of the data. Upon execution of the machine learning routine, memory requests are issued for particular data items in storage. The header information may indicate whether the data may be processed at a deterministic processing rate, for example, it is uncompressed, or whether it may be processed at a non-deterministic processing rate, for example, it is compressed. The header information may also comprise further characteristics of the data, such as an uncompressed size of the data for example. Combining the data characteristics with information relating to a buffer size characteristic, memory requests may be issued by the master at a corresponding data request rate.

FIG. 1 is a flow diagram showing a method 100 for requesting data according to examples. At item 110, a master such as a processor, for example, a machine learning processor, identifies one or more data characteristics of the data it is requesting. Such characteristic information may be stored in a header of the data and may indicate whether the data may be processed at a deterministic or non-deterministic rate, whether the data is compressed, and if so what the size of the uncompressed data is.

At item 120 the master may identify a buffer size characteristic indicative of the size of an internal memory buffer. The buffer size characteristic may represent the total size of the buffer, or alternatively may represent a type characteristic, such as type 1, type 2 etc, which are indicative of known/predetermined buffer sizes.

Once the desired data characteristics and the buffer size characteristic have been identified at items 110 and 120, the method 100 moves to item 130, where the master issues a plurality of memory requests to read the data from storage. Based on the identified characteristics of the data and the buffer, such as such the available buffer size, the processing power available, and whether the data is capable of being processed at a deterministic rate or not, the master determines the data request rate at which to issue memory requests and issues them. The master may issue the memory requests directly to storage, or alternatively, the master may issue the memory requests to one or more memory controllers.

The data request rate of memory requests issued by the master is dependent on the characteristics of the data determined at the compile time of the routine used to issue the memory requests and the buffer size characteristic. It will be appreciated that the data request rate of memory requests issued may be based on other characteristics as well. For example, when the master determines that the data requests may be processed at a non-deterministic processing rate, the master may issue memory requests at a first data request rate. If the master determines that the data requests may be processed at a deterministic processing rate, the master may issue memory requests at a second, higher, data request rate, since data which may be processed at a deterministic processing rate may be processed as it is received from storage.

Figure 2:
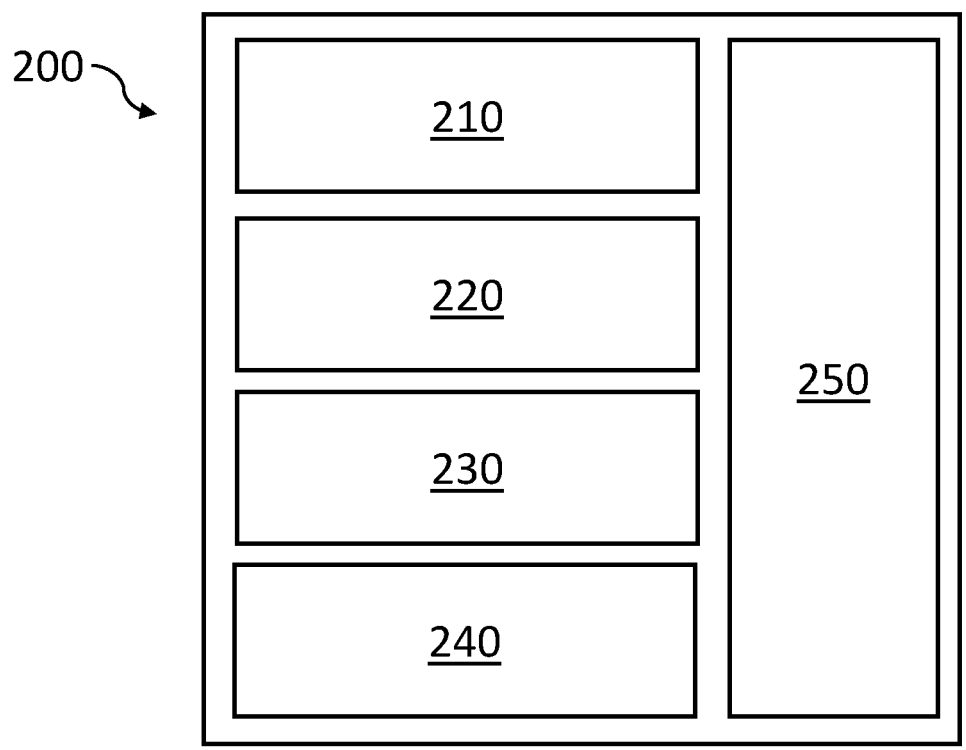
FIG. 2 is a schematic representation of a processor for requesting data according to examples.

FIG. 2 shows schematically, a master 200, such as a processor, for example, a machine learning processor, for fetching data from storage according to examples. The master 200 comprises a characteristic identification module 210 for identifying one or more characteristics of the data to be fetched from storage (not shown). For example, the characteristic identification module 210 may be arranged to undertake step 110 of method 100 of FIG. 1. The characteristic identification module 210, obtains details regarding one or more characteristics of the data, for example, whether the data may be processed at a deterministic or non-deterministic processing rate. The one or more characteristics of the data may be stored in a header file of the data. The characteristics stored in the header file may be generated at the compile time of a routine arranged to issue the memory requests.

The master 200 also comprises a buffer 220 for storing data items as they are received from storage. The buffer 220 may be of a predetermined size such that it is capable of holding a known quantity of data. The buffer has an associated size characteristic which may be indicative of the actual size of the buffer 220, or may in some embodiments be a predetermined type which is indicative of a particular size.

The master 200 also comprises a memory request issuance module 230 for issuing memory requests. The memory request issuance module 230 may be arranged to undertake item 120 of method 100 of FIG. 1. The memory request issuance module 230 issues memory requests from the master, either directly to the storage or to a memory controller arranged to manage access the storage. The memory request issuance module 230 issues memory requests based on the identified one or more characteristics of the data to be fetched from storage and the buffer size characteristic. For example, where the characteristic identification module 210 obtains the header information which indicates that the data can be processed at a non-deterministic processing rate, the memory request issuance module 230 issues memory requests at a first data request rate, and when the header information indicates that the data can be processed at a deterministic processing rate, the memory request issuance module 230 issues memory requests at a second, higher, data request rate. The first and second data request rates are based on a size characteristic of the buffer 220.

The master 200 also comprises a pre-processing module 240. The pre-processing module 240 is arranged to undertake the pre-processing of the data, if necessary, prior to forwarding the data to the main processing module 250. The pre-processing module 240 may, for example, be a decompressor arranged to decompress data which has been previously compressed. For example, as mentioned above, where data has been previously compressed it may be processed at a non-deterministic processing rate. In such embodiments, only data which has been compressed need be passed to the pre-processing module 240 prior to being passed to the main processing module 250. As the pre-processing module 240 can only pre-process, such as decompress, the data at a predetermined rate the number of memory requests issued reflects this, and the memory request issuance module 230 issues requests at a corresponding data request rate.

The main processing module 250 of the master 200 is arranged to process the data requested. If the data can be processed at a deterministic processing rate, the main processing module 250 can process the data at the rate it is received from storage (not shown), therefore the main processing module 250 can receive the data directly from the buffer 220. When the data is only able to be processed at a non-deterministic processing rate, the data needs to be pre-processed, therefore the main processing module 250 receives the data from the pre-processing module 240 after the data has been pre-processed. For example, where the data is compressed, the pre-processing module 240 may be a decompressor which decompresses the data prior to passing the decompressed data to the main processing module 250.

Figure 3A:
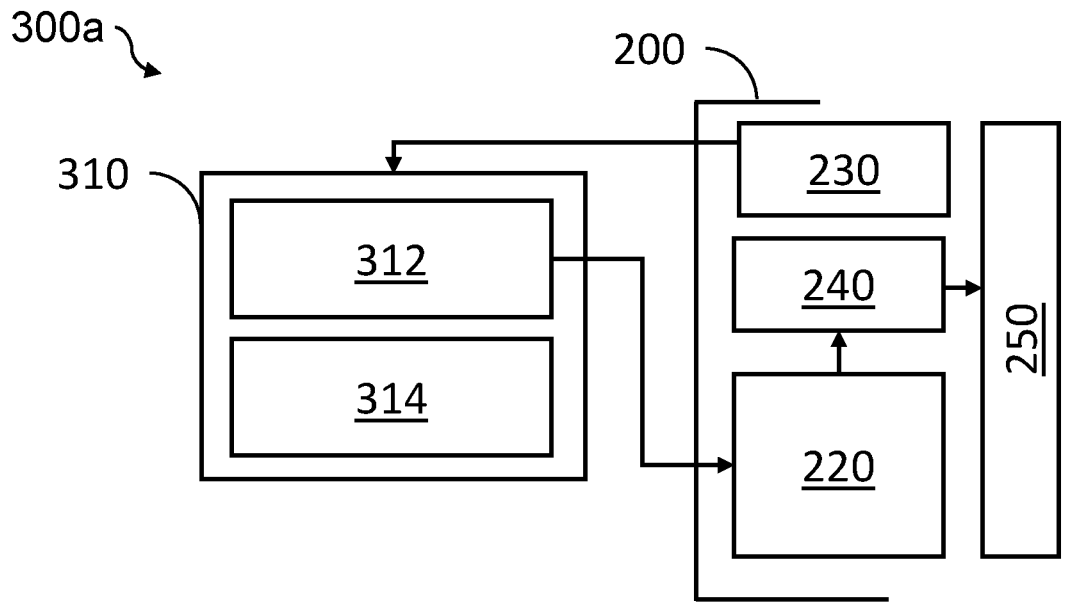
FIG. 3a is a schematic representation of a process showing the stages of the method of FIG. 1 according to a first example.

FIG. 3a is a schematic representation of a process 300a showing the stages of the method of FIG. 1 according to a first example where the data 312 received from storage 310 is processed at a non-deterministic processing rate. The processor 200 of the process 300a comprises a characteristic identification module (not shown), a memory request issuance module 230, a buffer 220, a pre-processing module 240, and a main processing module 250. It will be appreciated that the processor 200 may in some embodiments comprise other modules, such as a driver for a machine learning processor. The processor 200 may, in some embodiments, be the processor 200 described above in relation to FIG. 2.

The pre-processing module 240, as described above, is arranged to undertake any necessary pre-processing for data which can be processed at a non-deterministic processing rate. For example, where the data is compressed, the pre-processing module is a decompressor for decompressing data retrieved from storage 310.

The processor 200 comprises the memory request issuance module 230 issuing a number of memory requests to storage 310. The memory request issuance module 230 issues requests based on a current state of the processor 200, for example, the memory request issuance module 230 will issue memory requests based on a size characteristic of the buffer 220, and also based on the one or more characteristics identified by the characteristic identification module (not shown). For example, where the characteristic identification module (not shown) indicates that the data can be processed at a non-deterministic processing rate, the memory request issuance module 230 may issue memory requests via a memory controller (not shown), such as a dynamic memory controller, at a first data request rate.

The process 300a of FIG. 3a shows the memory request issuance module 230 for issuing memory requests for data which can be processed at a non-deterministic processing rate, such as compressed data 312. The compressed data 312 is read into the buffer 220 of the processor 200. The data request rate of the memory requests issued by the memory request issuance module 230 for the compressed data 312 may be based on the size characteristic of the buffer 220, as the amount of time required to decompress the data by the pre-processing module 240 is unknown.

The compressed data 312 is passed to the pre-processing module 240, in this case, a decompressor, to be decompressed. The decompressed data is then passed to the main processing module 250. As the amount of time required to decompress, or otherwise pre-process the compressed data 312, or any other data which is processed at a non-deterministic processing rate, is unknown, the data request rate of the memory requests issued by the memory request issuance module 230 must consider this and the size characteristic of the buffer 220 to prevent buffer overrun and ensure the entirety of the requested data may be processed. Therefore, the memory request issuance module 230 issues memory requests at a first data request rate, to ensure that all the compressed data 312 may be processed by the main processing module 250 without causing buffer overrun.

Figure 3B:
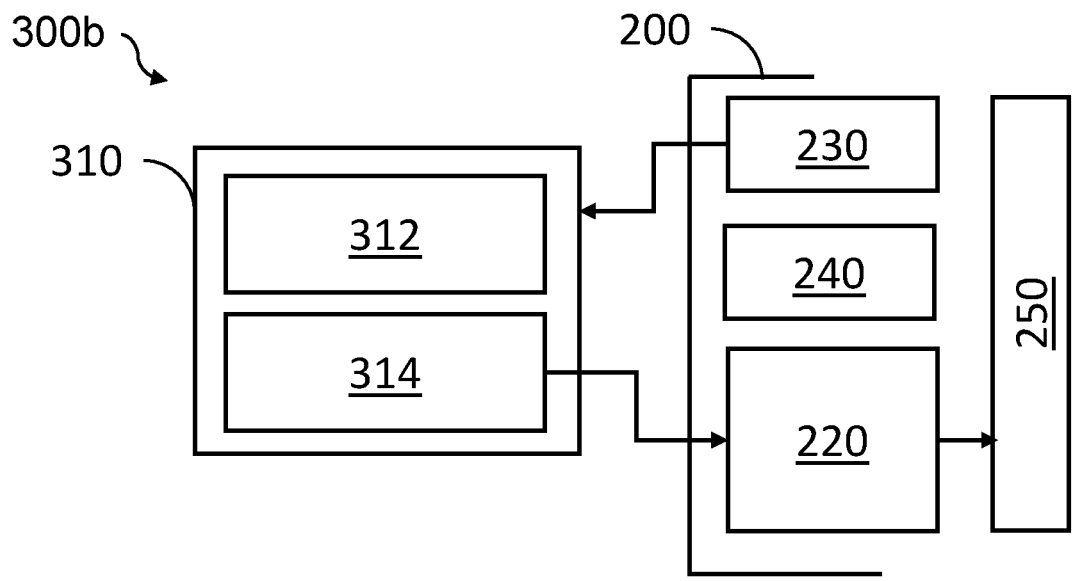
FIG. 3b is a schematic representation of a process showing the stages of the method of FIG. 1 according to a second example.

FIG. 3b is a schematic representation of a process 300b showing the stages of the method of FIG. 1 according to a first example, where the data 314 received from storage 310 is processed at a deterministic processing rate, comprises a characteristic identification module (not shown), a memory request issuance module 230, a buffer 220, a pre-processing module 240, and a main processing module 250. It will be appreciated that the processor 200 may in some embodiments comprise other modules, such as a driver for a machine learning processor. The processor 200 may, in some embodiments, be the processor 200 described above in relation to FIG. 2.

The process 300b comprises the memory request issuance module 230 for issuing memory request to storage 310 for data which can be processed at a deterministic processing rate, such as uncompressed data 314 The uncompressed data 314 is read into the buffer 220 of the processor 200. The memory request issuance module 230 issues memory requests based on a current state of the processor 200, for example the memory request issuance module 230 will issue memory requests based on the size of the buffer 220, and also based on the whether the characteristic identification module (not shown) determines whether to issue memory requests for data which may be processed deterministically or non-deterministically for example.

The process 300b of FIG. 3b shows the memory request issuance module 230 issuing memory requests for data which may be processed deterministically, such as uncompressed data 314. The uncompressed data 314 is read into the buffer 220 of the processor 200. The data request rate of the memory requests issued by the memory request issuance module 230 for the uncompressed data 314 may be based on the size characteristic of the buffer 220, however the data request rate of the memory request for the uncompressed data may relate to uncompressed data 314 that exceeds the size of the buffer 220. Since the uncompressed data 314 does not require any pre-processing it is able to be processed by the main processing module 250 from the buffer 220 without the need for any pre-processing by the pre-processing module 240.

Since the uncompressed data 314 may be processed by the main processing module 250 as it is read from storage 310, the buffer 220 may be smaller than the amount of data requested by the memory requests issued by the memory request issuance module 230, or alternatively the memory request issuance module 230 may issue memory requests at a data rate such that the amount of data requested exceeds the size of the buffer 220. This is because as data is added to the buffer 220 it may be removed just as quickly to be processed by the main processing module 250.

Figure 4:
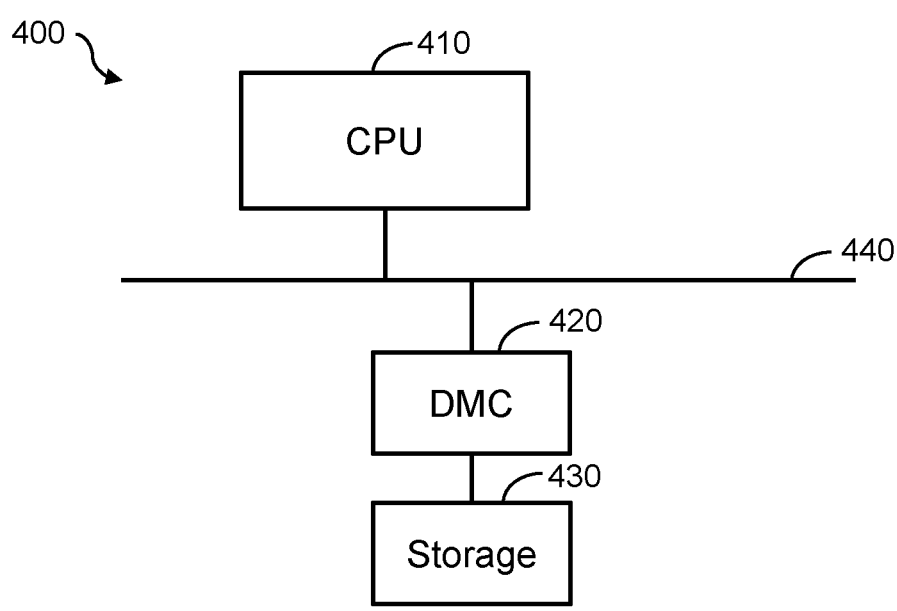
FIG. 4 is a schematic representation of a system for requesting data according to examples.

FIG. 4 shows schematically of a system 400 for managing memory requests according to examples. The system 400 includes at least one processor 410 which may act as a master, such as the master 200 described above in relation to FIG. 2. In this example, the system 400 may include a machine learning processor (not shown) which, in some embodiments, may be the processor 200 described above in relation to FIG. 2. It will be appreciated that the system 400 may also comprise alternative and/or additional processors, such as a microprocessor, a general-purpose processor, a digital signal processor (DSP), an application specific integrated circuit (ASIC), a field programmable gate array (FPGA), neural network accelerator (NNA), neural network processor (NNP), or other programmable logic device, a discrete gate or transistor logic, discrete hardware components, or any suitable combination thereof designed to perform the functions described herein. The system 400 may also or alternatively include a processor implemented as a combination of computing devices, for example, a combination of a DSP and a microprocessor, a plurality of microprocessors, one or more microprocessors in conjunction with a DSP core, or any other such configuration. The system 400 may also or alternatively include at least one graphics processing unit (GPU).

When the processor 410 is a machine learning processor, the processor 410 may include a driver (not shown) which, for example, provides an interface between software configured to control or configure a neural network, and which may be configured to perform the processing to implement the neural network. In other examples, the neural network may be implemented using a more general processor, such as a CPU or a GPU.

The system 400 may also include one or more memory controllers, which may be dynamic memory controllers (DMC) 420 which may be used to control access to storage 430 of the system 400 according to the method 100 described above in relation to FIG. 1. The storage 430 is, for example, external to the processor 410 and may be a random-access memory (RAM) such as DDR-SDRAM (double data rate synchronous dynamic random-access memory). In other examples, the storage 430 may be or include a non-volatile memory such as Read Only Memory (ROM) or a solid-state drive (SSD) such as Flash memory. The storage 430 in examples may include further storage devices, for example magnetic, optical or tape media, compact disc (CD), digital versatile disc (DVD) or other data storage media. The storage 430 may be removable or non-removable from the system 400.

The one or more DMCs 420 may be external to the processor 410 as depicted in FIG. 4, or alternatively, the DMCs 420 may form part of the processor 410. In some embodiments, the DMCs 420 may form part of a memory access unit which may be external to the processor 410. In further embodiments, it will be appreciated that the system 400 may comprise DMCs 420, some which form part of the processor 410 and some which are external to the processor 410.

The components of the system 400 in the example of FIG. 4 are interconnected using a systems bus 440. This allows data to be transferred between the various components. The bus 440 may be or include any suitable interface or bus. For example, an ARM® Advanced Microcontroller Bus Architecture (AMBA®) interface, such as the Advanced eXtensible Interface (AXI), may be used.

The order of processing steps in the examples described above are merely examples. In other examples, these processing steps may be performed in a different order.

It is to be understood that any feature described in relation to any one example may be used alone, or in combination with other features described, and may also be used in combination with one or more features of any other examples, or any combination of any other examples. Furthermore, equivalents and modifications not described above may also be employed without departing from the scope of the accompanying claims.

What is claimed is:

1. A method of requesting data by a processor from storage, the processor comprising a buffer, and wherein the processor and storage are interconnected by a system bus, the method comprising the steps of:
    identifying one or more characteristics of data to be fetched from storage, wherein the characteristics comprise at least a data type indicative of whether the data is compressed or uncompressed;
    identifying a buffer size characteristic of the buffer of the processor, the buffer size characteristic representing the total size of the buffer;
    determining a current state of the processor; and
    issuing memory requests at a given memory request rate by the processor for the data based on the identified characteristics of the data, the current state of the processor, and the buffer size characteristic,
    wherein, when the data type indicates the data is compressed, the method comprises:
        determining a decompressed size of the data; and
        setting the given memory request rate based on the decompressed size, the current state of the processor, and the buffer size characteristic.

2. The method of requesting data according to claim 1, wherein the characteristics of the data further comprises a data size.

3. The method of requesting data according to claim 1, wherein the data type is further indicative of whether the processor can process the data at a deterministic processing rate or at a non-deterministic processing rate.

4. The method of requesting data according to claim 3, wherein the given memory request rate is a first data request rate when the data can be processed at the non-deterministic processing rate and a second, higher, data request rate when the data can be processed at the deterministic processing rate.

5. The method of requesting data according to claim 1, further comprising the step of decompressing the data as it is fetched from storage.

6. The method of requesting data according to claim 1, wherein the one or more characteristics are predetermined at a compile time of a routine which is used to issue the memory requests.

7. The method of requesting data according to claim 6, wherein the routine is a machine learning routine.

8. The method of requesting data according to claim 1, wherein the storage is any of random-access memory, dynamic-random access memory, or non-volatile memory.

9. A processor for fetching data from storage wherein the processor and storage are interconnected by a system bus, the processor comprising:
  a characteristic identification module for identifying one or more characteristics of data to be fetched from storage, wherein the characteristics comprise at least a data type indicative of whether the data is compressed or uncompressed;
  a buffer for storing the data fetched from the storage, prior to being processed by the processor; and
  a memory request issuance module for issuing memory requests at a given memory request rate to fetch the data from storage, based on the identified-characteristics of the data, a current state of the processor, and a size characteristic of the buffer representing the total size of the buffer,
  wherein when the data type indicates the data is compressed, the memory request issuance module:
    determines a decompressed size of the data; and
    sets the given memory request rate based on the decompressed size, the current state of the processor, and the buffer storage characteristic.

10. The processor for fetching data from storage according to claim 9, wherein the characteristics of the data further comprises a data size.

11. The processor for fetching data from storage according to claim 9, wherein the characteristic identification module further identifies whether the data type indicates that the data to be fetched from storage can be processed by the processor at a deterministic processing rate or non-deterministic processing rate.

12. The processor for fetching data from storage according to claim 11, wherein the given memory request rate is a first data request rate when the data can be processed at the non-deterministic processing rate and a second, higher, data request rate when the data can be processed at the deterministic processing rate.

13. The processor for fetching data from storage according to claim 9, the one or more characteristics are predetermined at a compile time of a routine which is used to issue the memory request.

14. The processor for fetching data from storage according to claim 9, wherein the storage is any of random-access memory, dynamic-random access memory, or non-volatile memory.

15. The processor for fetching data from storage according to claim 9, wherein the processor is a machine learning processor.

16. A system for fetching data from storage, the system comprising:
  storage;
  one or more memory controllers arranged to access the storage;
  a processor for requesting data from storage wherein the processor and storage are interconnected by a system bus, and wherein the processor is arranged to issue memory requests to the one or more memory controllers based on characteristics of the data, wherein the processor comprises:
    a characteristic identification module for identifying one or more characteristics of data to be fetched from the storage, wherein the characteristics comprises at least a data type indicative of whether the data is compressed or uncompressed;
    a buffer for storing the data fetched from the storage, prior to being processed by the processor; and
    a memory request issuance module for issuing memory requests at a given memory request rate to fetch the data from storage, based on the identified characteristics of the data, a current state of the processor, and a size characteristic of the buffer representing the total size of the buffer,
    wherein, when the data type indicates the data is compressed the memory request issuance module:
      determines a decompressed size of the data; and
      sets the given memory request rate based on the decompressed size, the current state of the processor, and the buffer size characteristic.

17. The system for fetching data according to claim 16, wherein the storage is any of random-access memory, dynamic-random access memory, or non-volatile memory.

18. The system for fetching data according to claim 16, wherein the memory controllers are dynamic memory controllers.

19. A non-transitory computer readable storage medium comprising a set of computer-readable instruction stored thereon which, when executed by at least one processor, cause the at least one processor to:
  identify one or more characteristics of data to be fetched from storage, wherein the processor and storage are interconnected by a system bus, and wherein the characteristics comprise at least a data type indicative of whether the data is compressed or uncompressed;
  identify a buffer size characteristic of a buffer of the processor, the buffer size characteristic representing the total size of the buffer;
  determine a current state of the processor; and
  issue memory requests at a given memory request rate by the processor for the data based on the identified characteristics of the data, the current state of the processor, and the buffer size characteristic,
  wherein, when the data type indicates the data is compressed the method comprises:
    determining a decompressed size of the data; and
    setting the given memory request rate based on the decompressed size, the current state of the processor, and the buffer size characteristic.

* * * * *